United States Patent
Zimmer et al.

(10) Patent No.: US 6,873,580 B2
(45) Date of Patent: Mar. 29, 2005

(54) OBJECTIVE LENS ALIGNMENT IN OPTICAL PICKUP UNIT ASSEMBLY

(75) Inventors: Erik J. Zimmer, Denver, CO (US); Scott D. Wilson, Westminster, CO (US); Ian R. Redmond, Boulder, CO (US); Bernard W. Bell, Lafayette, CO (US); Daniel G. Bergeson, Arvada, CO (US)

(73) Assignee: DPHI Acquisitions, Inc., Boulder, CO (US)

(*) Notice: Subject to any disclaimer, the term of this patent is extended or adjusted under 35 U.S.C. 154(b) by 627 days.

(21) Appl. No.: 09/846,052

(22) Filed: May 1, 2001

(65) Prior Publication Data

US 2002/0167884 A1 Nov. 14, 2002

(51) Int. Cl.[7] .................................................. G11B 7/00
(52) U.S. Cl. ........................... 369/44.12; 369/112.28
(58) Field of Search .......................... 369/44.15, 44.14, 369/44.11, 112.28, 44.12, 112.01, 112.23, 44.23, 112.19, 44.24; 700/59

(56) References Cited

U.S. PATENT DOCUMENTS

| | | | |
|---|---|---|---|
| 6,023,378 A | 2/2000 | Schaenzer | |
| 6,327,241 B1 | 12/2001 | Boutaghou et al. | |
| 6,392,819 B1 | 5/2002 | Harada | |
| 6,631,302 B1 * | 10/2003 | Wilson | 700/59 |
| 2002/0036839 A1 | 3/2002 | Kishima et al. | |
| 2002/0041562 A1 | 4/2002 | Redmond et al. | |

FOREIGN PATENT DOCUMENTS

| | | |
|---|---|---|
| EP | 0 863 502 A2 | 9/1998 |
| JP | 2000 322756 A | 11/2000 |
| JP | 2000 348373 A | 12/2000 |
| JP | 2001 004891 A | 5/2001 |
| WO | WO 01/78073 A2 | 10/2001 |

* cited by examiner

*Primary Examiner*—Nabil Hindi
(74) *Attorney, Agent, or Firm*—MacPherson Kwok Chen & Heid LLP

(57) ABSTRACT

Disclosed is a method of attaching components of an optical head. In one embodiment, first and second optical assemblies of the optical head are positioned adjacent to each other. The first optical assembly may include a first optical element, and the second optical assembly may include a second optical element. Both of the first and second optical elements are configured to transmit light for reading or writing data to an optical data storage media. The position of a first optical assembly is adjusted with respect to the second optical assembly until the first optical element and second optical elements are in optical communication with each other. Thereafter, the first and second optical assemblies are rigidly connected while the first and second optical elements are in optical communication with each other.

1 Claim, 3 Drawing Sheets

OBJECTIVE LENS ALIGNMENT IN OPTICAL PICKUP UNIT ASSEMBLY

CROSS-REFERENCE TO RELATED APPLICATIONS

This application is related to application Ser. No. 09/457,104, filed Dec. 7, 1999, entitled "Low Profile Optical Head" and application Ser. No. 09/544,370, filed Apr. 6, 2000, entitled "System And Method For Aligning Components Of Optical Head" both of which are incorporated herein by reference in their entirety.

BACKGROUND OF THE INVENTION

Optical heads and optical data storage media are employed in optical disk storage devices of, for example, computers and personal electronic devices. Optical heads typically include a laser source and optical components for directing a laser beam onto the surface of the optical data storage media for the purpose of either reading or writing data thereto. The laser source and optical components must be optically aligned with each other before the optical head can properly read or write data to the optical data storage media. In conventional optical heads, the optical components are connected to each other such that the optical components can be moved relative to each other and to the laser source. Thus, the position of the optical components can be manually adjusted relative to each other and to the laser source so that, after assembly, the optical components can be aligned with each other and with the laser source.

The increasing miniaturization of computers and personal electronic devices has led to a need for extremely small optical heads. The above-referenced applications Ser. Nos. 09/457,104 and 09/544,370 describe a low-profile optical head used in optical disk storage devices that can have a height (measured perpendicular to the optical disk) of, for example, 3.25 mm. This optical head is formed from a laser source and several optical components. Because of their minute size, the laser source and optical components are fixedly attached to each other with a permanent adhesive during assembly of the low-profile optical head. As such, the position of the laser source and the optical components cannot be adjusted after assembly of the optical head. If correct alignment within tolerances is not achieved during assembly of this optical head, it will not function as intended.

SUMMARY OF THE INVENTION

Disclosed is a method of attaching components of an optical head. In one embodiment, first and second optical assemblies of the optical head are positioned adjacent to each other. The first optical assembly may include a first optical element, and the second optical assembly may include a second optical element. Both of the first and second optical elements are configured to transmit light for reading or writing data to an optical data storage media. The position of a first optical assembly is adjusted with respect to the second optical assembly until the first optical element and second optical elements are in optical communication with each other. Thereafter, the first and second optical assemblies are rigidly connected while the first and second optical elements are in optical communication with each other.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

Figure 1:
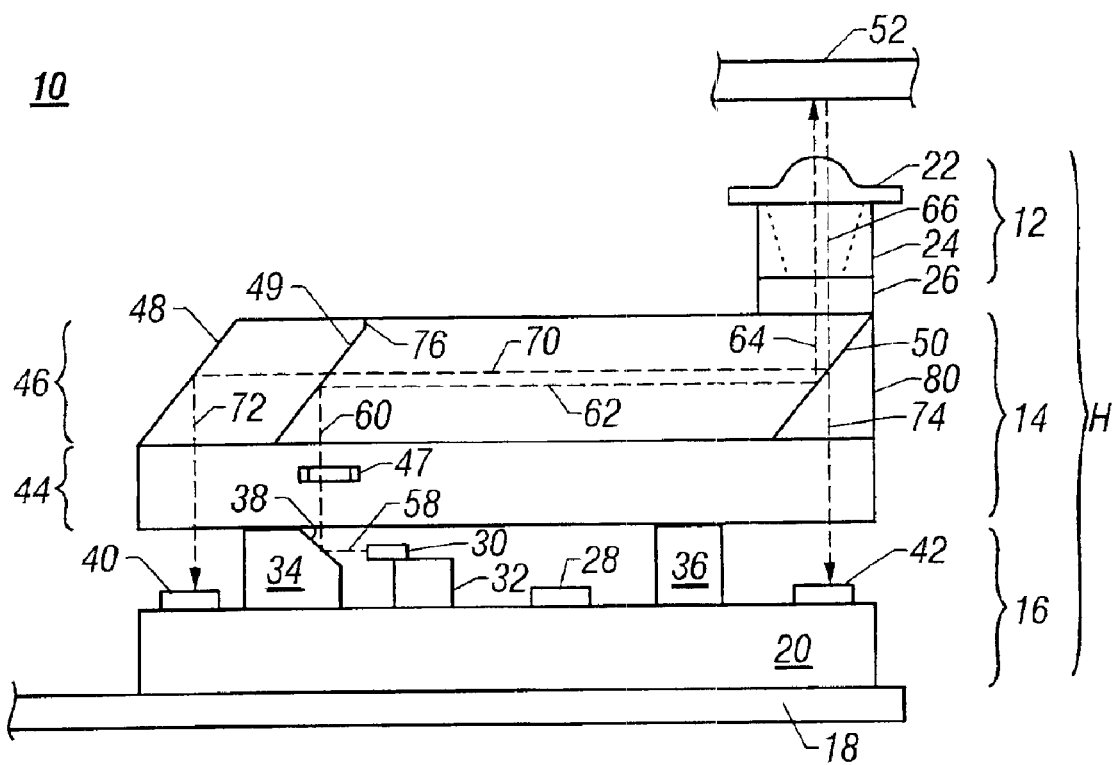
FIG. 1 is a side view of an optical head having a substrate with a light source mounted thereto in accordance with the present invention.

While the invention is susceptible to various modifications and alternative forms, specific embodiments thereof are shown by way of example in the drawings and will herein be described in detail. However, the drawings and detailed description thereto are not intended to limit the invention to the particular form disclosed. On the contrary, the intention is to cover all modifications, equivalents, and alternatives falling within the spirit and scope of the present invention as defined by the appended claims.

DETAILED DESCRIPTION

FIG. 1 is a side view of a low-profile optical head or optical pick-up unit (OPU) 10 for use in reading or writing optical data to an optical data storage media such as an optical data storage disk. OPU 10 and various alternative embodiments thereof are described in application Ser. Nos. 09/457,104 and 09/544,370. OPU 10 is shown assembled from several components. In FIG. 1, OPU 10 includes a lens assembly 12, an optical prism assembly (OPA) 14, a submount 16, and a flex circuit 18. Each of these components is assembled from one or more sub-components.

As shown in FIG. 1, lens assembly 12 includes an objective lens 22 fixedly connected to a spacer 24. Spacer 24 includes a bore through which light is transmitted. Lens assembly 12 is fixedly connected to OPA 14 via quarter-wave plate 26. FIG. 1 also shows a section of an optical media (disk) 52 that is positioned a preselected distance (e.g., 0.3 mm) from objective lens 22. Objective lens 22 focuses a reading or writing laser beam originating from a laser light source, more fully described below, onto a surface of the optical disk 52. Reading light reflected from optical disk 52 is collected and transmitted back through objective lens 22 and is subsequently converted into electrical signals by light detectors more fully described below.

Figure 2:
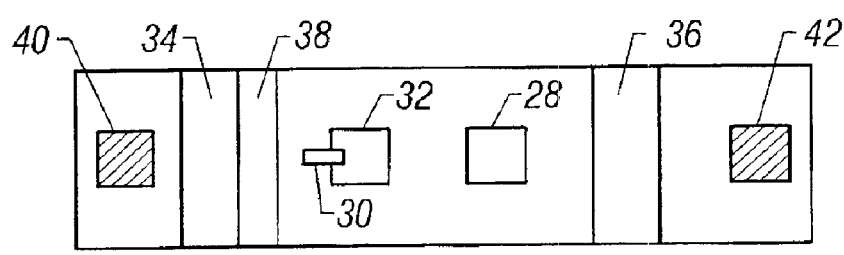
FIG. 2 is a top view of the substrate shown in FIG. 1 with the light source mounted thereto.

FIG. 2 shows a top view of submount 16. With reference to FIGS. 1 and 2, submount 16 includes an integrated circuit 28 and a laser assembly permanently mounted on a substrate 20. The laser assembly includes an edge-emitting laser diode 30 attached to a laser mount 32. Laser diode may generate light having a wavelength of 650 nm for use in reading or writing data to optical disk 52. The substrate 20 may be a die cut from a silicon wafer. Submount 16 also includes spacer blocks 34 and 36 interposed between substrate 20 and OPA 14. One side of spacer block 34 is provided with a 45° turning mirror 38 that reflects to a vertical upward direction a laser beam emitted horizontally by laser diode 30. Submount 16 includes light detectors 40 and 42 attached to substrate 20. Light detectors 40 and 42 detect light reflected from the optical disk 52.

Laser diode 30, integrated circuit 28, and light detectors 40 and 42 are electrically connected to each other or to other electrical devices external to OPU 10 via wire bonds, conductors on substrate 20, and conductors on flex circuit 18. On substrate 20 and flex circuit 18 are bond pads (not shown in FIGS. 1 and 2) onto which ends of wire bonds are attached. Wire bonds electrically connect bond pads on substrate 20 and bond pads on flex circuit 18. Through this arrangement, power, data, and control signals can travel between electrical devices external to the OPU 10 and devices mounted on substrate 20.

With continuing reference to FIG. 2, the OPA 14 includes a prism element or periscope 46 fixedly attached to an optical element (OE) block 44. OE block 44 includes a forward sense element (FSE) 47. The FSE includes an inner circular shaped element that transmits a portion of the light beam emitted by the laser diode 30. An outer ring surrounds the inner transmissive element. The outer ring includes a diffraction grating that deflects a portion of the laser light emitted by the laser diode. The laser light deflected by the diffraction grating falls incident onto detector elements mounted on substrate 20. These detectors generate signals that are proportional to the intensity of deflected light received thereby. These signals are used to control and maintain the intensity of the light emitted by laser diode 30. OE block 44 is formed from a material substantially transparent to the laser beam emitted by laser diode 30. OE block 44 may include optical components or devices other than FSE 47. Periscope 46 can be made of a number of materials, including fused silica or flint glass ($SF_2$), that is substantially transparent to the laser beam emitted by laser diode 30. One end of periscope 46 is horizontally angled at about 45° and is coated with a substantially reflective coating, such as aluminum or silver, to form a turning mirror 48. Periscope 46 also includes first and second internal polarization beam splitter surfaces (hereinafter referred to as beam splitters) 49 and 50, also horizontally angled at about 45°, which are substantially reflective (i.e., acting as mirrors) for light of a first polarization (e.g., s-polarization) and substantially transmissive for light of a second polarization (e.g., p-polarization).

A laser beam emitted by laser diode 30 follows a forward path to optical disk 52. Light reflected from optical disk 52 follows return paths to light detectors 40 and 42. In this embodiment, the forward path includes a first section 58 between laser diode 30 and turning mirror 38, a second section 60 between turning mirror 38 and beam splitter 49, a third section 62 between beam splitters 49 and 50, and a fourth section 64 that travels from beam splitter 50, through objective lens 22, and on to optical disk 52. Each of the FSE 47, quarter-wave plate 26, spacer 24, and objective lens 22 is optically aligned with the forward path. The light detector 40 return path includes a first section 66 from optical disk 52, through objective lens 22 and on to beam splitter 50, a second section 70 from beam splitter 50, through beam splitter 49 and on to turning mirror 48, and a third section 72 between turning mirror 48 and detector 40. The light detector 42 return path includes first section 66 from optical disk 52, through objective lens 22 and on to beam splitter 50, and a second section 74 between beam splitter 50 and detector 42. Each of the objective lens 22, spacer 24, and quarter-wave plate 26 is optically aligned with the return path. Detectors 40 and 42 are optically aligned with the first and second portions, respectively. Ideally, the fourth section 64 of the forward path coincides with the first section 66 of the return paths.

As will be understood by those skilled in the art, the polarization of the beam emitted by laser diode 30 is such that the beam is reflected by beam splitters 49 and 50 on its forward path. As the beam passes through quarter-wave plate 26 in the forward and return directions, the polarization of the beam on its return path is changed such that a first polarized component of the beam is reflected by beam splitter 50 and passes through beam splitter 49, while a second polarized component of the beam passes through beam splitter 50.

OPU 10 is minute. With reference to FIG. 1, the height H can be as little as 3.25 mm. For proper operation, laser diode 30 must be aligned within tolerance during assembly such that its emitted laser beam passes through the central axis of objective lens 22. Otherwise, the beam will not be properly focused on optical disk 52, and data cannot be written. In addition, the beam reflected from optical disk 52 must fall at precisely the correct location on light detectors 40 and 42. Otherwise, data cannot be read from optical disk 52. There are numerous manufacturing tolerances and possible sources of error that can affect these two requirements, for example, the angle at which the laser beam emerges from laser diode 30, the angles of turning mirrors 38 and 48, the angles of beam splitters 49 and 50, and the locations of objective lens 22 with respect to periscope 46 and to light detectors 40 and 42. Careful attention must be paid to alignment tolerances throughout the assembly process. If any of the optical components or the laser diode are positioned and fixed outside of alignment tolerances during assembly, OPU 10 will not function as intended.

In conventional optical heads, optical components, such as lenses and mirrors, are connected such that the position of the optical components can be adjusted with respect to each other or to the laser light source. Thus, the optical components and the laser light source can be aligned with respect to each other after assembly of the conventional optical head. However, because of OPU 10's miniature size, its components are permanently bonded together during assembly, and later adjustment for optical alignment is impossible. Accordingly, OPU 10 must be carefully fashioned with a view towards alignment of the optical components during assembly of the optical head, not thereafter.

OPU 10 can be assembled in one of many different sequences. Each step in a sequence may include fixedly bonding one optical component to another. Before the optical components are bonded to each other in each step, they must be optically aligned within manufacturing tolerances. This alignment is imperative in that, unlike conventional optical heads, the alignment and fixed placement of optical components and the laser diode are achieved during assembly of the OPU 10. Otherwise the resulting OPU 10 will not read or write data to optical data storage media. Below is one exemplary sequence that can be used to assemble a functional OPU 10 having properly aligned optical components:

1. Optically aligning and subsequently bonding objective lens 22 to spacer 24.
2. Optically aligning and subsequently bonding periscope 46 to OE block 44.
3. Optically aligning and subsequently bonding quarter-wave plate 26 to periscope 46.
4. Optically aligning and subsequently bonding lens assembly 12 to quarter-wave plate 26.
5. Optically aligning and subsequently bonding laser diode 30 to substrate 20 via laser mount 32.
6. Bonding integrated circuit 28 to substrate 20.
7. Bonding submount 16 to flex circuit 18.
8. Optically aligning and subsequently bonding submount 16 to OPA 14.

While the foregoing is one assembly process to produce a functional OPU 10, alternative assembly processes can be used. For example, in an alternative assembly process, steps 5–7 may occur before steps 1–4. The steps set forth above can be performed manually or in an automated fashion. Below is a more detailed description of the steps set forth above. It should be noted that each of the above steps involves sub-steps. Although each step above involves a sequence of sub-steps, each step should not be limited to the sequence of sub-steps described below.

Optical Alignment and Subsequent Bonding of Spacer 24 to Objective Lens 22

The objective lens 22 must be positioned concentric to the spacer 24 within a tolerance as small as 5.0 micrometers. To achieve this tolerance, spacer 24 is held stationary while objective lens 22 is moved, or vice versa. The position of objective lens 22 relative to spacer 24 can be adjusted manually using the tool described in application Ser. No. 09/544,370 in addition to mechanical stages such as the Newport UMR8.25 and fine adjustment micrometers such as the Newport DM11.25. It is important to measure the tolerance using, for example, a Nikon MM-40L3 measurement microscope. Once the desired position of objective lens 22 relative to spacer 24 is achieved, the position of the objective lens 22 relative to spacer 24 is adjusted so that they engage each other at mating surfaces thereof. Thereafter, a small amount of ultraviolet (UV) adhesive, such as Norland Optical Adhesive (NOA) #61, is applied to objective lens 22 and spacer 24. In this fashion, the adhesive spans across the lens and spacer on sidewalls thereof. Alternatively, the UV adhesive could be applied to one of the mating surfaces of objective lens 22 and spacer 24 before the position of objective lens 22 is adjusted relative to spacer 24. The UV adhesive is ultimately subjected to ultraviolet light using, for example, an EFOS Novacure system. The UV light activates the UV adhesive to create a solid UV adhesive bond between objective lens 22 and spacer 24. Adhesive cure time can be as little as 20 seconds.

Optical Alignment and Subsequent Bonding of Periscope 46 and OE Block 44

A small amount of UV adhesive can be applied to the surface of OE block 44 that mates with the periscope 46, or vice versa. Although not shown in the diagrams, a pair of machined moats is formed in the upper surface of OE block 44. UV adhesive is applied between these machined moats. The machined moats act as boundaries beyond which the UV adhesive cannot flow. Thereafter, OE block 44 is positioned with respect to periscope 46 such that FSE 47 is within a certain distance from an upper edge 76 of beam splitter 49. The distance between FSE 47 and upper edge 76 may be as small as 0.475 millimeters. It is important to measure the distance using, for example, the Nikon MM-40L3 measurement microscope. Once the position of OE block 44 is confirmed within tolerance, the UV adhesive is subjected to UV light and activated to create a solid UV adhesive bond. Cure time may be as little as 20 seconds.

Optical Alignment and Subsequent Bonding of Quarter-Wave Plate 26 to Periscope 46

Quarter-wave plate 26 should be attached to periscope 46 so that quarter-wave plate 26 is in optical alignment with the forward and return paths. This can be achieved by first applying a small drop of UV adhesive to a surface portion of the periscope 46 near the front edge 80 where quarter-wave plate 26 is to be attached. Alternatively, UV adhesive could be applied to a surface of quarter-wave plate 26 that mates with periscope 46. Quarter-wave plate 26 is then positioned on the surface of periscope 46 so that a front edge of the quarter-wave plate 26 is at a predetermined distance from the front surface 80 of the periscope. If placed within tolerance of the predetermined distance from the front surface 80 of periscope 46, quarter-wave plate 26 should be aligned with the forward and return paths. Before the UV adhesive is cured, the quarter-wave plate 26 can be moved with respect to periscope 46 until the spacing tolerance to front surface 80 is met. Once the applied UV adhesive completely wicks across the interface between periscope 46 and quarter-wave plate 26, the adhesive is cured into a solid UV adhesive bond using UV light. Cure time can be as little as 20 seconds.

In an alternative embodiment, the quarter-wave plate 26 could be positioned on periscope 46 before application of UV adhesive. After the quarter-wave plate 26 is moved into alignment with the forward and return paths, UV adhesive could be applied to both the quarter-wave plate 26 and periscope 46 while they engage each other. The UV adhesive could then be cured using UV light to create a solid bond between the wave plate and the periscope.

Optical Alignment and Subsequent Bonding of Lens Assembly 12 to Quarter-Wave Plate 26

The lens assembly should be attached to quarter-wave plate 26 so that lens assembly 12 is in optical alignment with the forward and return paths. Optical alignment is meant to mean that a center of the forward or return paths aligns substantially with a center of lens 22. The FSE 47 can be used to properly align the lens assembly 12 by viewing FSE 47 through the objective lens 22 using, for example, the Nikon MM-40L3 measurement microscope. FSE 47 is circular in shape when viewed through the forward path. If FSE 47 is seen substantially concentric with objective lens 22 through the microscope, objective lens 22 should be substantially aligned with the forward and return paths. In one embodiment, a small amount of UV adhesive is applied to either the spacer 24 or quarter-wave plate 26. The UV adhesive can be applied to a surface of spacer 24 that will mate with the quarter-wave plate 26, or vice versa. For purposes of explanation, alignment and subsequent bonding of the lens assembly and quarter-wave plate will be described with UV adhesive applied to a mating surface of quarter-wave plate 26, it being understood that the present invention should not be limited thereto. The lens assembly 12 is then positioned over the top of quarter-wave plate 26. At this point, the lens assembly 12 may or may not engage the UV adhesive applied to the quarter-wave plate 26. The lens assembly can be moved with respect to quarter-wave plate 26 until FSE 47 is seen concentric (e.g., within a tolerance of five micrometers) with objective lens 22. Once alignment of the objective lens 22 is within tolerance, the adhesive is exposed to UV light and cured to form a solid bond between quarter-wave plate 26 and spacer 24. An intervening step of dropping the lens assembly vertically to engage the UV adhesive may be necessary. Cure time can be as little as 20 seconds.

Alternatively, the lens assembly 12 is positioned in engagement or over the quarter-wave plate 26 and subsequently aligned with respect to FSE 47. Once properly aligned, UV adhesive is applied to both the quarter-wave plate 26 and a side of spacer 24 while the lens assembly engages the quarter-wave plate 26. The UV adhesive is then subjected to UV light for curing.

Optical Alignment and Subsequent Bonding of Laser Diode 30 to Substrate 20 via Laser Mount 32

Figure 3:
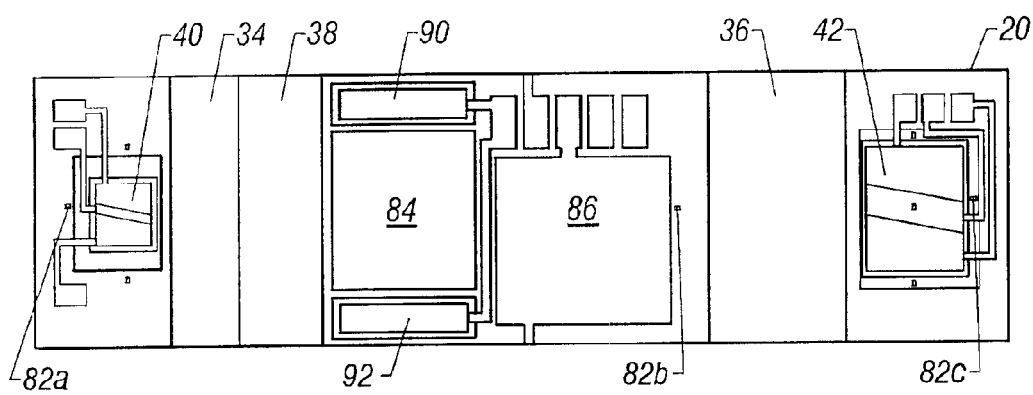
FIG. 3 is a top view of the substrate shown in FIG. 1 before the light source assembly is mounted thereto.
Figure 4:
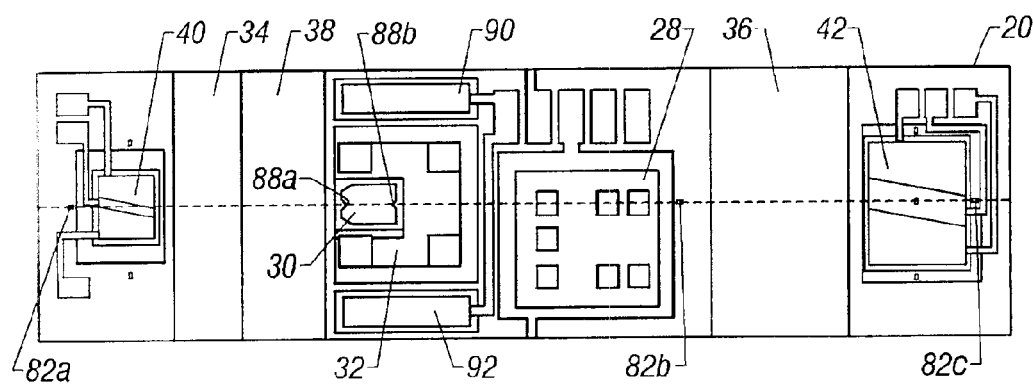
FIG. 4 is a top view of the substrate shown in FIG. 1 after the light source assembly is mounted thereto.

FIG. 3 illustrates a detailed top view of substrate 20 before laser diode 30 and integrated circuit 28 are attached thereto. FIG. 3 also shows laser mount pad 84, integrated circuit bond pad 86, and detectors 90 and 92 mounted to respective detector pads. Detectors 90 and 92 generate signals in response to receiving light deflected by FSE 47. The signals generated by detectors 90 and 92 are used to control the intensity of the light emitted by laser diode 30. FIG. 4 illustrates a detailed top view of substrate 20 after the laser diode 30 and integrated circuit 28 are attached thereto.

Laser diode 30 should be attached to substrate 20 via laser mount 32 so that the laser beam output of laser diode 30 is optically aligned with the forward path. This can be achieved in part by aligning one or more alignment marks on the laser diode 30 with a centerline of the substrate 20. The centerline of substrate 20 may be designated by one or more alignment marks on the substrate 20 or on light detectors 40 and 42.

In one embodiment, a silver-based adhesive, such as CR1033B made by Sumitomo, Inc., is applied to the substrate 20 on the laser mount pad 84. Alternatively, the silver-based adhesive can be applied to a mating surface of the laser mount 32. For purposes of explanation, alignment and subsequent bonding of laser diode 30 to substrate 20 via laser mount 32 will be described with the silver-based adhesive being applied to laser mount pad 84, it being understood that the present invention should not be limited thereto. The silver-based adhesive can be activated by the application of heat to create a fixed bond between laser mount 32 and laser mount pad 84. Once activated, the resulting bond provides a thermal conductor that aids in dissipation of heat generated by laser diode 30. Other adhesives are contemplated for attaching laser mount 32 to substrate 20. In another alternative, the laser mount 32 may be soldered to laser mount pad 84 after alignment of laser diode 30 to the centerline of substrate 20.

After application of the silver-based adhesive, the laser mount 32 with laser diode 30 attached thereto, is placed over the laser mount pad 84 using, for example, a flip chip bonder such as the Fine Tech Pico 145 flip chip bonder. At this point, the laser mount may or may not engage the silver-based adhesive. The bonded laser diode 30/laser mount 32 may be moved relative to substrate 20 using the tooling described in application Ser. No. 09/544,370 along with the Newport UMR8.25 mechanical stages and the Newport DM11.25 micrometers. It is important to check that the position of laser diode 30 is within alignment tolerance using, for example, the Nikon MM-40L3 measurement microscope.

FIGS. 3 and 4 show alignment marks 82a–82b that coincide with the centerline of substrate 20. The Nikon MM-40L3 measurement microscope is placed over alignment mark 82a, and substrate 20 is rotated until cross-hairs of the microscope align with alignment mark 82a. Thereafter, substrate 20 is moved laterally along the x-axis until alignment mark 82b is seen. The substrate is then rotated until alignment mark 82b is aligned with the cross-hairs of the microscope. Once both alignment marks 82a and 82b are aligned with the cross-hairs of the microscope as the substrate is moved laterally back and forth along the x-axis, the centerline of substrate 20 is substantially aligned with the cross-hairs of the microscope.

Laser diode 30 includes alignment marks 88a and 88b as shown in FIG. 4. A line extending between alignment marks 88a and 88b on the laser diode 30 corresponds to a direction at which laser diode 30 emits its laser beam. Alignment marks 88a and 88b can be used to align the laser beam output of laser diode 30 with the forward path. More particularly, the laser beam output of the laser diode can be aligned by positioning the laser diode 30 so that a line extending between alignment marks 88a and 88b is parallel or substantially parallel to the centerline extending between alignment marks 82a and 82b on substrate 20.

It may be necessary to correct any skew of laser diode 30 as measured with respect to the centerline of substrate 20. After the correction of any laser diode skew, the substrate 20 is moved until laser diode 30 is within the microscope's view. Alignment mark 88a or 88b on the laser diode 30 and alignment mark 82a or 82b on substrate 20 can be viewed concurrently through the Nikon MM-40L3 measurement microscope. The laser diode 30 is moved with respect to substrate 20 until alignment marks 88a and 88b are aligned with the cross-hairs of the microscope along the centerline of substrate 20. Once the alignment marks 88a and 88b of laser diode 30 and the centerline of the substrate are aligned, the silver-based adhesive is heated to a fixed bond by placing the substrate 20 into a thermal chamber for a period of time at a particular temperature. An intervening step of dropping the laser mount 32 vertically to engage the silver-based adhesive may be necessary. In one embodiment, the substrate is heated at 160° C. for sixty minutes. It is important to check the position of laser diode 30 using, for example, the Nikon MM-40L3 measurement microscope.

Bonding of Integrated Circuit 28 to Substrate 20

Once laser diode 30 is properly aligned with the forward path, a small amount of a silver-based adhesive is applied on the integrated circuit bond pad 86. Alternatively, the silver-based adhesive may be applied to a mating surface of the integrated circuit 28 that mates with integrated circuit bond pad 86. Thereafter, integrated circuit 28 is positioned on integrated circuit bond pad 86 using the Fine Tech Pico 145 flip chip bonder. The substrate 20 is placed in a thermal chamber and subjected to thermal curing for a particular time and temperature to create a fixed bond between the integrated circuit 28 and the integrated circuit bond pad 86. In one embodiment, the substrate 20 is cured for sixty minutes at 160° C. It is important to check the position of integrated circuit 28 using, for example, the Nikon MM-40L3 measurement microscope.

Bonding of the Submount 16 to Flex Circuit 18

Once the submount 16 is assembled, an adhesive (such as Epotek T7109) is applied to the surface of flex circuit 18 that is to mate with submount 16, or vice versa. The submount 16 is subsequently positioned on the flex circuit 18 using, for example, the Fine Tech Pico 145 flip chip bonder. The submount 16 is positioned within tolerance on flex circuit 18. The assembly is placed in a thermal chamber, and the adhesive cured at a particular temperature and time into a fixed bond between the submount 16 and flex circuit 18. In one embodiment, the combination of submount 16 and flex circuit 18 is cured for fifteen minutes at 150° C. It is important to check the position of the submount 16 on flex circuit 18 using, for example, the Nikon MM40L3 measurement microscope.

Figure 5:
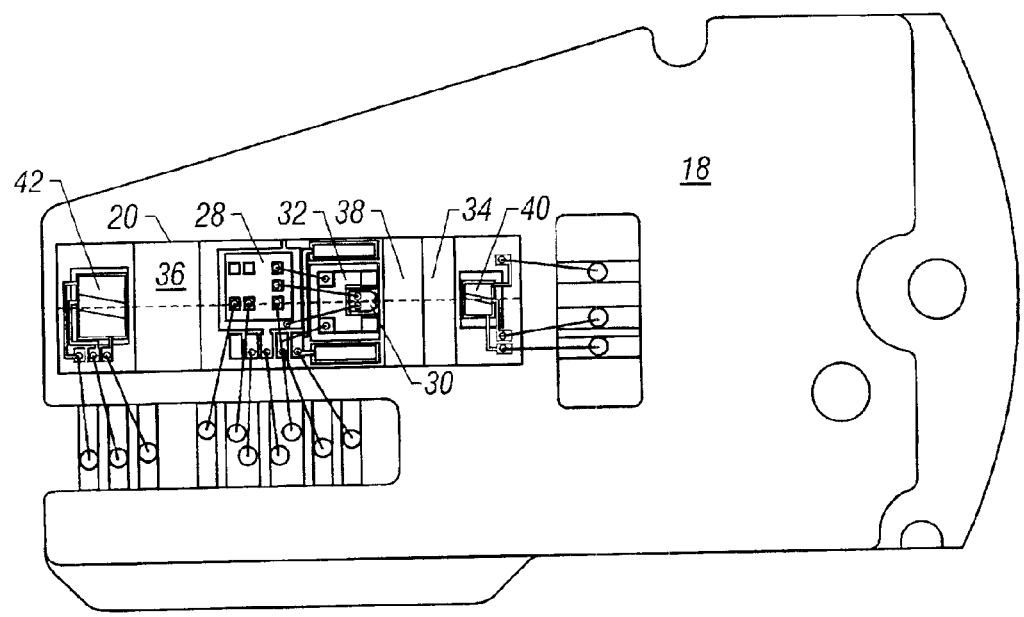
FIG. 5 is a top view of the substrate shown in FIG. 4 mounted onto a flexible circuit.
Figure 6:
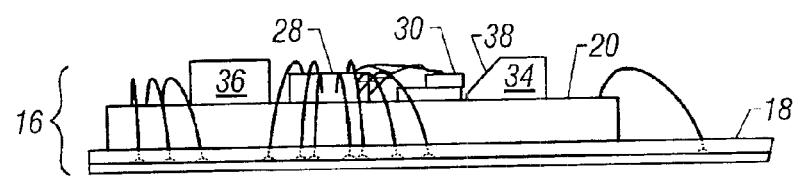
FIG. 6 is a side view of the substrate shown in FIG. 5 mounted onto a flexible circuit.

Electrical connection between the submount 16 and the flex circuit 18 is made using wire bonds. These wire bonds can be formed using an ultrasonic wedge bonder, such as the K&S 1472, or ESEL 3088 or similar equipment operating at 100 kilohertz. The wire may be 1.0 mm wire formed from aluminum and silicon or gold and silicon. FIGS. 5 and 6 show top and side views, respectively, of submount 16 mounted to flex circuit 18 and wire bonds therebetween. In FIGS. 5 and 6, wire bonds are shown connected between pads on substrate 20 and pads on flex circuit 18. Further, FIG. 6 shows wire bonds connecting integrated circuit 28 to laser diode 30.

The wire bonds may be subjected to a pull strength test once attached to bond pads. In one embodiment, the wire bonds are required to meet a minimum pull strength of 8 grams. If the wire bonds pass the pull strength test, they are visually inspected under magnification using a zoom scope (such as the Nikon SMZ-1) to ensure that all bonds are connected properly. Thereafter, electrical power is provided to devices on the substrate 20 including the laser diode 30 and integrated circuit 28 via flex circuit 18, wire bonds, and conductors on substrate 20, and the power is measured as the laser diode 30 generates a laser beam. The laser beam emitted from the laser diode 30 is measured using a Newport hand held detector (P.N. 818-ST/CM). The intensity of the output of laser diode 30 is measured against power provided to substrate 20 devices. This information may be used to approximate read power current.

Optical Alignment and Subsequent Bonding of OPA 14 to Submount 16

The remaining task for OPU 10 assembly is attachment of the OPA 14 with the submount 16 so that the laser beam emitted by laser diode 30 correctly aligns with all sections of the forward path. Power is provided to submount 16 via flex circuit 18, and laser diode 30 emits the laser beam. Turning mirror 38 turns and directs the laser beam upward through OPA 14 and lens assembly 12. The OPA 14 is moved with respect to submount 16 until the laser beam emitted by laser diode 30 coincides with the forward path. This can be achieved by viewing the emission point of the laser beam through the objective lens 22 while moving submount 16. Application Ser. No. 09/544,370 describes a more detailed method for aligning the submount 16 with the OPA 14. Care must be taken to ensure that the power applied to the laser diode does not reach a level that can cause eye damage. Once the OPA 14 is aligned with the submount 16, a small amount of UV adhesive is applied to the interface between the submount 16 and the OPA 14. This adhesive is cured into a fixed bond by exposure to UV light. Alternatively, UV adhesive may be applied to surfaces of the spacer blocks 34 and 36 that mate with the OE block 44 of the OPA 14. The OPA 14 is moved with respect to submount 16 until the laser beam emitted by laser diode 30 coincides with the optical axis of objective lens 22. Thereafter, the UV adhesive is cured into a solid bond between the OE block 44 and spacer blocks 34 and 36. This bond can also be made using gold/tin solder. The older is heated and reflowed using an infrared laser beam.

Although the present invention has been described in connection with several embodiments, the invention is not intended to be limited to the specific forms set forth herein. On the contrary, it is intended to cover such alternatives, modifications, and equivalents as can be reasonably included within the spirit and scope of the invention as defined by the appended claims.

What is claimed is:

1. A method of assembling an objective lens and an optical assembly of an optical head comprising:

positioning the objective lens and the optical assembly adjacent to each other, wherein the optical assembly comprises a forward sense element (FSE);

adjusting a position of the objective lens with respect to the optical assembly until the objective lens and the FSE are in optical communication with each other;

rigidly connecting the objective lens and the optical assembly while the objective lens and the FSE are in optical communication with each other.

* * * * *